United States Patent
Shah et al.

(10) Patent No.: US 10,412,143 B2
(45) Date of Patent: Sep. 10, 2019

(54) METHODS, SYSTEMS, AND MEDIA FOR PRESENTING CONTENT BASED ON USER PREFERENCES OF MULTIPLE USERS IN THE PRESENCE OF A MEDIA PRESENTATION DEVICE

(71) Applicant: Google LLC, Mountain View, CA (US)

(72) Inventors: Raunaq Shah, San Francisco, CA (US); Matt Van Der Staay, San Jose, CA (US)

(73) Assignee: Google LLC, Mountain View, CA (US)

(*) Notice: Subject to any disclaimer, the term of this patent is extended or adjusted under 35 U.S.C. 154(b) by 196 days.

(21) Appl. No.: 15/319,100

(22) PCT Filed: Jun. 24, 2015

(86) PCT No.: PCT/US2015/037511
§ 371 (c)(1),
(2) Date: Dec. 15, 2016

(87) PCT Pub. No.: WO2015/200531
PCT Pub. Date: Dec. 30, 2015

(65) Prior Publication Data
US 2017/0155699 A1   Jun. 1, 2017

Related U.S. Application Data

(60) Provisional application No. 62/016,575, filed on Jun. 24, 2014, provisional application No. 62/016,421, (Continued)

(51) Int. Cl.
*G06F 3/14* (2006.01)
*H04L 29/06* (2006.01)
(Continued)

(52) U.S. Cl.
CPC .............. *H04L 65/607* (2013.01); *G06F 3/14* (2013.01); *G06F 16/285* (2019.01);
(Continued)

(58) Field of Classification Search
CPC ..................................... G06F 3/14; G06F 3/17
(Continued)

(56) References Cited

U.S. PATENT DOCUMENTS

| 6,530,083 B1 * | 3/2003 | Liebenow | ............... H04N 7/163 348/E7.061 |
| 2010/0017725 A1 * | 1/2010 | McCarthy | ............... H04W 4/04 715/745 |

(Continued)

OTHER PUBLICATIONS

International Preliminary Report on Patentability dated Jan. 5, 2017 in International Patent Application No. PCT/US2015/037511.
(Continued)

*Primary Examiner* — Ruay Ho
(74) *Attorney, Agent, or Firm* — Byrne Poh LLP

(57) ABSTRACT

Methods, systems, and media for associating multiple users with a media presentation device are provided. In some embodiments, the method comprises: receiving first user preferences; receiving second user preferences; receiving requests to associate the first user preferences and the second user preferences, respectively, with a media presentation device; causing the first user preferences and the second user preferences to be associated with identifying information of the media presentation device; receiving, from the media presentation device, a request to present a slideshow of images based on user preferences and identifying information of the first user device and a third user device; determining that the first user preferences are associated with the media presentation device; determining that user preferences of the third user device are not associated with the
(Continued)

media presentation device; and causing content based on the first user preferences to be presented by the media presentation device.

21 Claims, 4 Drawing Sheets

Related U.S. Application Data filed on Jun. 24, 2014, provisional application No. 62/016,428, filed on Jun. 24, 2014, provisional application No. 62/016,580, filed on Jun. 24, 2014.

(51) Int. Cl.
*G06F 16/28* (2019.01)
*G06F 16/435* (2019.01)
*G06F 16/438* (2019.01)
*H04L 29/08* (2006.01)
*G06F 3/0481* (2013.01)

(52) U.S. Cl.
CPC .......... *G06F 16/435* (2019.01); *G06F 16/438* (2019.01); *G06F 16/4393* (2019.01); *H04L 67/306* (2013.01); *H04L 67/34* (2013.01); *G06F 3/0481* (2013.01)

(58) Field of Classification Search
USPC .......... 715/730, 745; 707/728, 751; 348/E7.061
See application file for complete search history.

(56) References Cited

U.S. PATENT DOCUMENTS

| 2011/0231778 | A1  | 9/2011  | Hoag et al. |
| 2012/0066235 | A1* | 3/2012  | Itakura .............. G06F 17/30035 707/751 |
| 2012/0072944 | A1  | 3/2012  | Felt et al. |
| 2012/0158713 | A1* | 6/2012  | Jin .................... G06F 17/30029 707/728 |
| 2012/0272147 | A1  | 10/2012 | Strober |
| 2013/0144915 | A1  | 6/2013  | Ravi et al. |
| 2017/0091824 | A1* | 3/2017  | Leith .................. G06Q 30/0269 |

OTHER PUBLICATIONS

International Search Report and Written Opinion dated Oct. 2, 2015 in International Patent Application No. PCT/US2015/037511.
Examination Report dated May 15, 2019 in EP Patent Application No. 15744401.9.

* cited by examiner

METHODS, SYSTEMS, AND MEDIA FOR PRESENTING CONTENT BASED ON USER PREFERENCES OF MULTIPLE USERS IN THE PRESENCE OF A MEDIA PRESENTATION DEVICE

CROSS-REFERENCE TO RELATED APPLICATIONS

This application claims the benefit of U.S. Provisional Patent Application No. 62/016,421, filed Jun. 24, 2014, U.S. Provisional Patent Application No. 62/016,428, filed Jun. 24, 2014, U.S. Provisional Patent Application No. 62/016,575, filed Jun. 24, 2014, and U.S. Provisional Patent Application No. 62/016,580, filed Jun. 24, 2014. Each of the above-referenced patent applications is hereby incorporated by reference herein in its entirety.

TECHNICAL FIELD

The disclosed subject matter relates to methods, systems, and media for presenting content based on user preferences of multiple users in the presence of a media presentation device.

BACKGROUND

Media presentation devices that present background content, such as a slideshow of images, can access the content from a user account by receiving and storing a username and password of the user account. The username and password are used to retrieve content associated with the account, which is then presented by the media presentation device. However, this requires user credentials to be stored by the media presentation device and also is limited to presenting content of only one user.

Accordingly, new methods, systems, and media for presenting content based on user preferences of multiple users in the presence of a media presentation device are desirable.

SUMMARY

In accordance with some implementations of the disclosed subject matter, mechanisms for associating multiple users with a media presentation device are provided.

In accordance with some implementations of the disclosed subject matter, a method for determining content to be presented is provided, the method comprising: receiving, from a media presentation device, a request for content to be used in presenting a slideshow of images based on user preferences associated with user devices; receiving, from the media presentation device, identifying information of a first user device and identifying information of a second user device; retrieving, using a hardware processor, first user preferences associated with a first user using the identifying information of the first user device; retrieving, using the hardware processor, second user preferences associated with a second user using the identifying information of the second user device; generating, using the hardware processor, combined user preference information based on the first user preferences and the second user preferences; selecting, using the hardware processor, images for the slideshow from a plurality of images based on the combined user preferences and metadata associated with each of the plurality of images; and causing, using the hardware processor, the media presentation device to present the selected images as part of the slideshow as a response to the request.

In accordance with some implementations of the disclosed subject matter, a system for determining content to be presented is provided, the system comprising: a hardware processor that is programmed to: receive, from a media presentation device, a request for content to be used in presenting a slideshow of images based on user preferences associated with user devices; receive, from the media presentation device, identifying information of a first user device and identifying information of a second user device; retrieve, using a hardware processor, first user preferences associated with a first user using the identifying information of the first user device; retrieve, using the hardware processor, second user preferences associated with a second user using the identifying information of the second user device; generate, using the hardware processor, combined user preference information based on the first user preferences and the second user preferences; select, using the hardware processor, images for the slideshow from a plurality of images based on the combined user preferences and metadata associated with each of the plurality of images; and cause, using the hardware processor, the media presentation device to present the selected images as part of the slideshow as a response to the request.

In accordance with some implementations of the disclosed subject matter, a non-transitory computer-readable medium containing computer executable instructions that, when executed by a processor, cause the processor to perform a method for determining content to be presented is provided, the method comprising: receiving, from a media presentation device, a request for content to be used in presenting a slideshow of images based on user preferences associated with user devices; receiving, from the media presentation device, identifying information of a first user device and identifying information of a second user device; retrieving first user preferences associated with a first user using the identifying information of the first user device; retrieving second user preferences associated with a second user using the identifying information of the second user device; generating combined user preference information based on the first user preferences and the second user preferences; selecting images for the slideshow from a plurality of images based on the combined user preferences and metadata associated with each of the plurality of images; and causing the media presentation device to present the selected images as part of the slideshow as a response to the request.

In accordance with some implementations of the disclosed subject matter, a system for determining content to be presented is provided, the system comprising: means for receiving, from a media presentation device, a request for content to be used in presenting a slideshow of images based on user preferences associated with user devices; means for receiving, from the media presentation device, identifying information of a first user device and identifying information of a second user device; means for retrieving first user preferences associated with a first user using the identifying information of the first user device; means for retrieving second user preferences associated with a second user using the identifying information of the second user device; means for generating combined user preference information based on the first user preferences and the second user preferences; means for selecting images for the slideshow from a plurality of images based on the combined user preferences and metadata associated with each of the plurality of images; and means for causing the media presentation device to present the selected images as part of the slideshow as a response to the request.

In some implementations, the selected images include images with metadata indicating that the images are of the first user and images with metadata indicating that the images are of the second user, and the plurality of images includes images related to the first user and images related to the second user.

In some implementations, the system further comprises means for determining a common interest of the first user and the second user based on the retrieved first user preferences and the retrieved second user preferences, wherein the means for selecting images selects images with metadata indicating that the image corresponds to the common interest.

In some implementations, the first user preferences include first user preference scores for one or more topics based on the first user preferences and the second user preferences include second user preference scores for one or more topics based on the second user preferences, and the means for generating combined user preference information comprises means for generating combined user preference scores based on the first user preference scores and the second user preference scores.

In some implementations, the system further comprises: means for generating a group identifier; means for associating the group identifier with the first device and the second device; and means for associating the combined user preferences with the group identifier.

In some implementations, the system further comprises: means for receiving an indication that the second user device is no longer in proximity to the presentation device; and means for inhibiting use of the combined user preferences in determining which content is to be presented in response to receiving the indication.

In some implementations, the system further comprises: means for receiving, from the media presentation device, identifying information of a third user device; means for determining that third user preferences associated with a third user are not associated with the media presentation device; and means for inhibiting the third user preferences from being used to generate the combined user preferences.

In accordance with some implementations of the disclosed subject matter, a method for presenting content based on multiple user's preferences is provided, the method comprising: determining, using a hardware processor of a media presentation device, that content based on user preferences of users associated with the media presentation device is to be presented; identifying one or more user devices that are connected to a network to which the presentation device is also connected; receiving, from the one or more user devices, identifying information associated with each of the one or more user devices; submitting a request for content based on user preferences of users associated with the media presentation device to a remote server; transmitting the received identifying information associated with the one or more user devices to the remote server in association with the request for content; and causing content indicated by the remote server as a response to the request for content to be presented.

In accordance with some implementations of the disclosed subject matter, a system for presented content based on multiple user's preferences is provided, the system comprising: means for determining that content based on user preferences of users associated with a media presentation device is to be presented; means for identifying one or more user devices that are connected to a network to which the presentation device is also connected; means for receiving, from the one or more user devices, identifying information associated with each of the one or more user devices; mean for submitting a request for content based on user preferences of users associated with the media presentation device to a remote server; means for transmitting the received identifying information associated with the one or more user devices to the remote server in association with the request for content; and means for causing content indicated by the remote server as a response to the request for content to be presented.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with some implementations of the disclosed subject matter, mechanisms (which can include methods, systems and media) for presenting content based on user preferences of multiple users in the presence of a media presentation device are provided.

In some implementations, these mechanisms can allow user preferences for multiple users to be used when selecting content to be presented without requiring each of the users to manually select content for presentation. In some implementations, a media presentation device, such as a digital media receiver or media streaming device (which may not include a display) can request content to be presented when the media presentation device is on and outputting video data but lacks image and/or video content to be presented. For example, when the media presentation device first starts (e.g., before any content is requested for presentation), after a predetermined period of time has elapsed with no activity, when presentation of content in a queue of content to be presented has been completed, etc., the media presentation device can request personalized content to be presented. In such an example, personalized content can be, for example, a slideshow of images that are determined to be of interest to a user or users associated with the media presentation device.

In some implementations, the media presentation device can detect the presence of one or more user devices on a network that is common to the media presentation device.

Additionally, in some implementations, identifying information of user devices that the media presentation device detects as present can be used when requesting the personalized content from, for example, a server. For example, the media presentation device can detect that a smartphone associated with a first user and a tablet computer associated with a second user are connected to a Wi-Fi network to which the media presentation device is also connected. In such an example, the media presentation device can send identifying information of the smartphone and tablet, such as a MAC address, a device ID, etc., to the server with a request for content.

In some implementations, a server can select content based on the identifying information of devices that are detected by the media presentation device as being present. The server can, for example, identify user preferences for users associated with the devices that are present and select content based on a combination of the user preferences. In some implementations, the server can cause the media presentation device to present the selected content.

Figure 1:
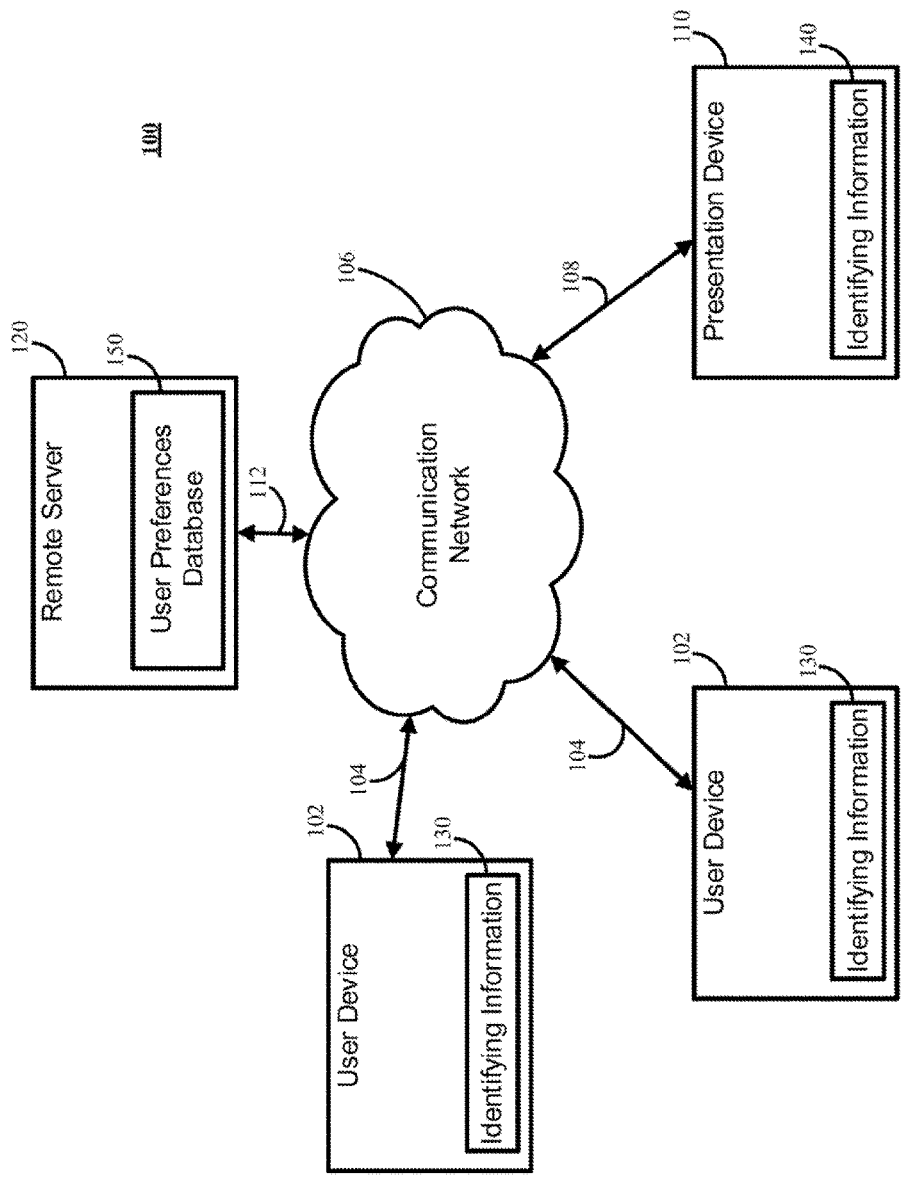
FIG. 1 shows an example of a generalized schematic diagram of a system on which the mechanisms for presenting content based on user preferences of multiple users in the presence of a media presentation device as described herein can be implemented in accordance with some implementations of the disclosed subject matter.

FIG. 1 shows an example 100 of a generalized schematic diagram of a system on which the mechanisms for presenting content based on user preferences of multiple users in the presence of a media presentation device as described herein can be implemented in accordance with some implementations of the disclosed subject matter. As illustrated, system 100 can include one or more user devices 102. User devices 102 can be local to each other or remote from each other. User devices 102 can be connected by one or more communications links 104 to a communication network 106 that can be linked to a server 120 via a communications link 112.

System 100 can include one or more presentation devices 110. Presentation devices 110 can be local to each other or remote from each other. Presentation devices 110 can be connected by one or more communications links 108 to communication network 106 that can be linked to server 120 via communications link 112 and/or user devices 102 via communications link 104.

System 100 can include one or more servers 120. Server 120 can be any suitable server or servers for providing access to the mechanisms described herein for presenting content based on user preferences of multiple users in the presence of a media presentation device, such as a processor, a computer, a data processing device, or any suitable combination of such devices. For example, the mechanisms for associating multiple users with a presentation device can be distributed into multiple backend components and multiple frontend components and/or user interfaces. In a more particular example, backend components, such as mechanisms for receiving requests to associate user preferences with a presentation device, requests identifying user preferences associated with a particular presentation device, requests to present content based on the user preferences, etc., can be performed on one or more servers 120. In another particular example, frontend components, such as mechanisms for presenting of content, requesting content to be presented, identifying user devices that are present, setting user preferences, causing a user device to be associated with a presentation device, etc., can be performed on one or more user devices 102 and/or presentation device 110.

In some implementations, each of user devices 102, presentation device 110 and server 120 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 102 can be implemented as a smartphone, a tablet computer, a wearable computer, a laptop computer, a portable game console, any other suitable computing device, or any suitable combination thereof. As another example, presentation device 110 can be implemented as a digital media receiver, a media streaming device, a game console, a set-top box, a television, a projector, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, one or more peer-to-peer connections, etc. Each of communications links 104, 108, and 112 can be any communications links suitable for communicating data among user devices 102, presentation device 110 and server 120, such as network links, dial-up links, wireless links, hard-wired links, any other suitable communications links, or any suitable combination of such links. Note that, in some implementations, multiple servers 120 can be used to provide access to different mechanisms associated with the mechanisms described herein for presenting content based on user preferences of multiple users in the presence of a media presentation device. For example, system 100 can include a user preferences server 120 that stores user preferences associated with one or more users and/or one or more user devices 102, a user preferences database server 120 that maintains one or more databases of correspondences between users and/or user devices 102 with which a particular presentation device 110 is associated, and a content delivery server 120 that determines which content to cause to be presented by the particular presentation device 110 based on the user preferences of users and/or user devices 102 associated with presentation device 110, and/or any other suitable servers for performing any suitable functions of the mechanisms described herein.

In some implementations, user device 102 can be associated with user identifying information 130. User identifying information 110 can identify a user of user device 102 and/or can identify user device 102. For example, in some implementations, user identifying information 130 can be a token or other data associated with a user of user device 102. For example, the token or other data can identify a user associated with a particular user account of a product and/or service. In a more particular example, such a token or other information can include a string of characters that is associated with a particular email address that was used to sign in to an application on the user device. As another example, user identifying information 130 can be identifying information of user device 102, such as a MAC address, a device ID, a serial number, and/or any other suitable identifying information of user device 102. As yet another example, user identifying information 130 can be a combination of identifying information of a user and identifying information of user device 102.

In some implementations, presentation device 110 can be associated with presentation device identifying information 140. Presentation device identifying information 140 can identify a user of presentation device 110 and/or can identify presentation device 110. For example, in some implementations, device identifying information 140 can be a token or other data associated with a user of presentation device 110. For example, the token or other data can identify a user associated with a particular user account of a product and/or service. In a more particular example, such a token or other information can include a string of characters (which can be, for example, randomly assigned) that is associated with a particular email address that was used as a credential to log in to an application on the presentation device. As another example, presentation device identifying information 140 can be identifying information of presentation device 110, such as a MAC address, a device ID, a serial number, and/or any other suitable identifying information of presentation device 110. As yet another example, presentation device identifying information 140 can be a combination of identifying information of a user and identifying information of presentation device 110. In some implementations, presentation device identifying information 140 can include semantically meaningful identifying information, such as a user assigned name (e.g., "Brett's Living Room Streaming Device").

In some implementations, presentation device identifying information 140 can include a persistent identifier for presentation device 110 that can be assigned based on any suitable conditions. For example, a device ID of presentation device 110 can be assigned when presentation device 110 is initialized and/or reinitialized. In a more particular example, during initialization presentation device 110 can contact a server to request a persistent device ID. In some implementations, this device ID can be assigned by the server such that each presentation device has a unique device ID. Additionally, presentation device 110 can receive a different device ID upon presentation device 110 being reset or otherwise reinitialized. In some implementations, such a device ID can be used to associate user preferences and/or any other suitable information (e.g., at a server) with presentation device 110 for later use in determining content to be presented using presentation device 110.

In some implementations, server 120 can store a user preferences database 150. User preferences database 150 can include user preferences associated with a user of a particular user device 102 (e.g., associated with user identifying information 130 of that user device 102). Additionally or alternatively, in some implementations, user preferences database 150 can include information identifying which users are associated with which presentation devices (e.g., by relating user identifying information 130 and presentation device identifying information 140). In some implementations, information in user preferences database 150 can be organized using any suitable technique or combination of techniques. For example, user preferences database 150 can be organized as a relational database.

In some implementations, information stored in user preferences database can be stored such that personal information of a user is obscured. For example, user identifying information 130 and/or presentation device identifying information 140 can be an assigned identification number and/or code name and user preferences can be associated with such an identification number and/or code name.

Figure 2:
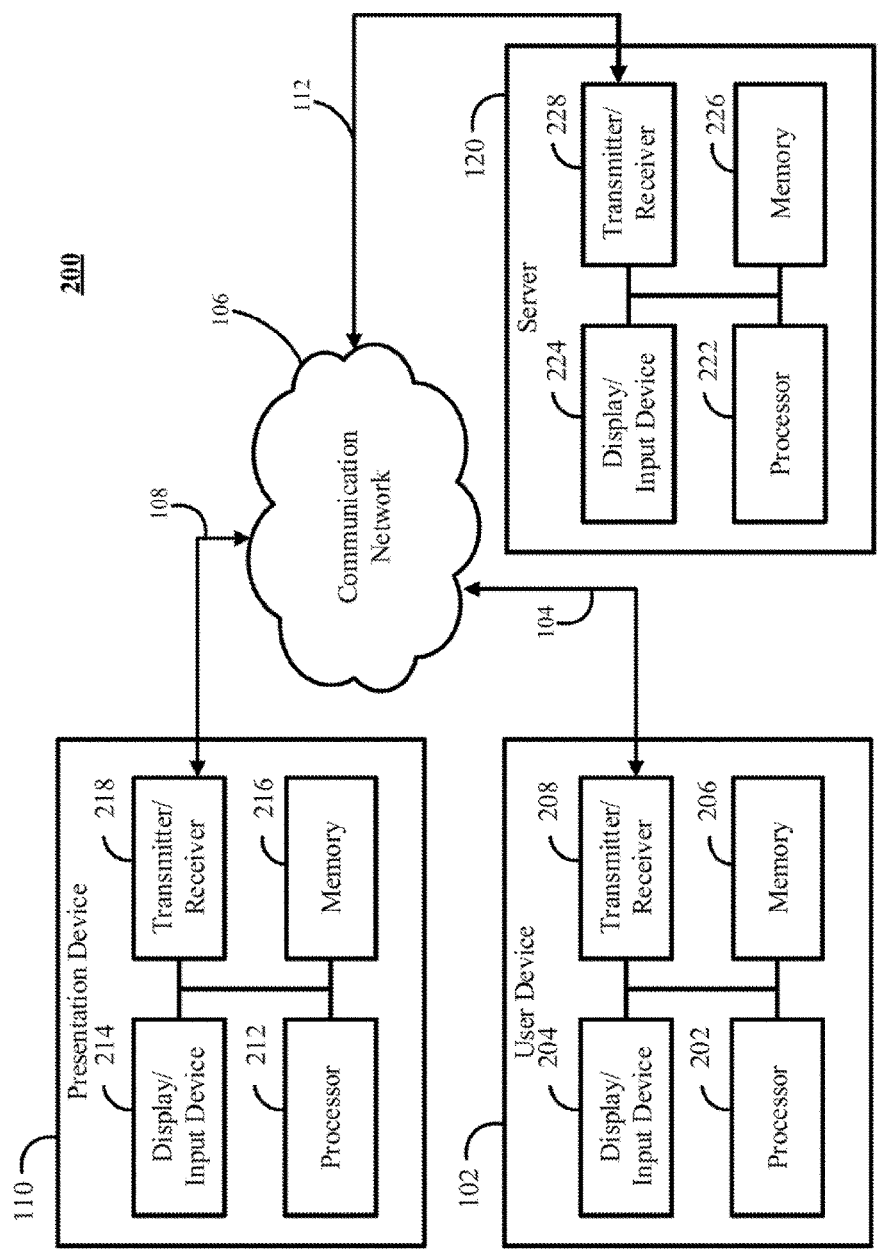
FIG. 2 shows an example of hardware that can be used to implement one or more of the user devices, presentation devices and servers depicted in FIG. 1 in accordance with some implementations of the disclosed subject matter.

FIG. 2 shows an example 200 of hardware that can be used to implement one or more of user devices 102, presentation devices 110 and servers 120 depicted in FIG. 1 in accordance with some implementations of the disclosed subject matter. Referring to FIG. 2, user device 102 can include a hardware processor 202, a display/input device 204, memory 206 and a transmitter/receiver 208, which can be interconnected. In some implementations, memory 206 can include a storage device (such as a computer-readable medium) for storing a user device program for controlling hardware processor 202.

Hardware processor 202 can use the user device program to execute and/or interact with the mechanisms described herein for presenting content based on user preferences of multiple users in the presence of a media presentation device, controlling presentation of the content on the presentation device, disassociating user preferences from the presentation device, setting user preferences, etc. In some implementations, the user device program can cause hardware processor 202 to, for example, interact with a presentation device and/or a device executing at least a portion of process 300 as described below in connection with FIG. 3. In some implementations, hardware processor 202 can send and receive data through communications link 104 or any other communication links using, for example, a transmitter, a receiver, a transmitter/receiver, a transceiver, or any other suitable communication device, such as transmitter/receiver 208. Display/input device 204 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. In some embodiments, display/input device 214 of presentation device 110 can be omitted. Transmitter/receiver 218 can include any suitable transmitter and/or receiver for transmitting and/or receiving, among other things, requests for content to be presented, content to be presented, signals to determine whether one or more user devices 102 are present, etc., and can include any suitable hardware, firmware and/or software for interfacing with one or more communication networks, such as network 106 shown in FIG. 2. For example, transmitter/receiver 218 can include network interface card circuitry, wireless communication circuitry, USB input and/or output circuitry, HDMI input and/or output circuitry, and/or any other suitable type of communication network circuitry, one or more antennas, and/or any other suitable hardware, firmware and/or software for transmitting and/or receiving signals.

Presentation device 110 can include a hardware processor 212, a display/input device 214, memory 216 and a transmitter/receiver 218, which can be interconnected. In some implementations, memory 216 can include a storage device (such as a computer-readable medium) for storing a presentation device program for controlling hardware processor 212.

Hardware processor 212 can use the presentation device program to execute and/or interact with the mechanisms described herein for presenting content based on user preferences of multiple users in the presence of a media presentation device, requesting content to present based on user preferences of associated users, request and/or transmit presentation device identifying information 140, etc. In some implementations, the presentation device program can cause hardware processor 212 to, for example, interact with a device executing at least a portion of process 300 as described below in connection with FIG. 3. In some implementations, hardware processor 212 can send and receive data through communications link 108 or any other communication links using, for example, a transmitter, a receiver, a transmitter/receiver, a transceiver, or any other suitable communication device, such as transmitter/receiver 218. Display/input device 214 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 218 can include any suitable transmitter and/or receiver for transmitting and/or receiving, among other things, requests for content to be presented, content to be presented, signals to determine whether one or more user devices 102 are present, etc., and can include any suitable hardware, firmware and/or software for interfacing with one or more communication networks, such as network 106 shown in FIG. 2. For example, transmitter/receiver 218 can include network interface card circuitry, wireless communication circuitry, and/or any other suitable type of communication network circuitry, one or more antennas, and/or any other suitable hardware, firmware and/or software for transmitting and/or receiving signals.

Server 120 can include a hardware processor 222, a display/input device 224, memory 226 and a transmitter/receiver 228, which can be interconnected. In some implementations, memory 228 can include a storage device for storing data received through communications link 112 or through other links. The storage device can further include a server program for controlling hardware processor 222. In some implementations, memory 228 can include information stored as a result of user activity and/or activity by a presentation device (e.g., user preferences, user identifying information 130, presentation device identifying information 140, user preferences database 150, content to be presented, requests for content to be presented, user credentials for use in accessing content to be presented, etc.). In some implementations, the server program can cause hardware processor 222 to, for example, execute at least a portion of process 300 as described below in connection with FIG. 3.

Hardware processor 222 can use the server program to communicate with user devices 102 and/or presentation device 110 as well as provide access to and/or copies of the mechanisms described herein. It should also be noted that data received through communications link 112 or any other communications links can be received from any suitable source. In some implementations, hardware processor 222 can send and receive data through communications link 112 or any other communication links using, for example, a transmitter, a receiver, a transmitter/receiver, a transceiver, or any other suitable communication device, such as transmitter/receiver 228. In some implementations, hardware processor 222 can receive commands and/or values transmitted by one or more user devices 102, presentation device 110, one or more other servers 120, and/or one or more users of server 120, such as a user that makes changes to adjust settings associated with the mechanisms described herein for associating multiple users with a media presentation device. Display 224 can include a touchscreen, a flat panel display, a cathode ray tube display, a projector, a speaker or speakers, and/or any other suitable display and/or presentation devices, and/or can include a computer keyboard, a computer mouse, one or more physical buttons, a microphone, a touchpad, a voice recognition circuit, a touch interface of a touchscreen, a camera, a motion sensor such as an optical motion sensor and/or an accelerometer, a temperature sensor, a near field communication sensor, a biometric data sensor, and/or any other suitable input device. Transmitter/receiver 228 can include any suitable transmitter and/or receiver for transmitting and/or receiving, among other things, content to be presented, user preferences, user identifying information 130, presentation device identifying information 140, requests for content, etc., and can include any suitable hardware, firmware and/or software for interfacing with one or more communication networks, such as network 106 shown in FIG. 2. For example, transmitter/receiver 228 can include network interface card circuitry, wireless communication circuitry, and/or any other suitable type of communication network circuitry, one or more antennas, and/or any other suitable hardware, firmware and/or software for transmitting and/or receiving signals.

In some implementations, server 120 can be implemented in one server or can be distributed as any suitable number of servers. For example, multiple servers 120 can be implemented in various locations to increase reliability and/or increase the speed at which the server can communicate with user devices 102 and/or presentation device 110. Additionally or alternatively, as described above in connection with FIG. 1, multiple servers 120 can be implemented to perform different tasks associated with the mechanisms described herein.

Figure 3:
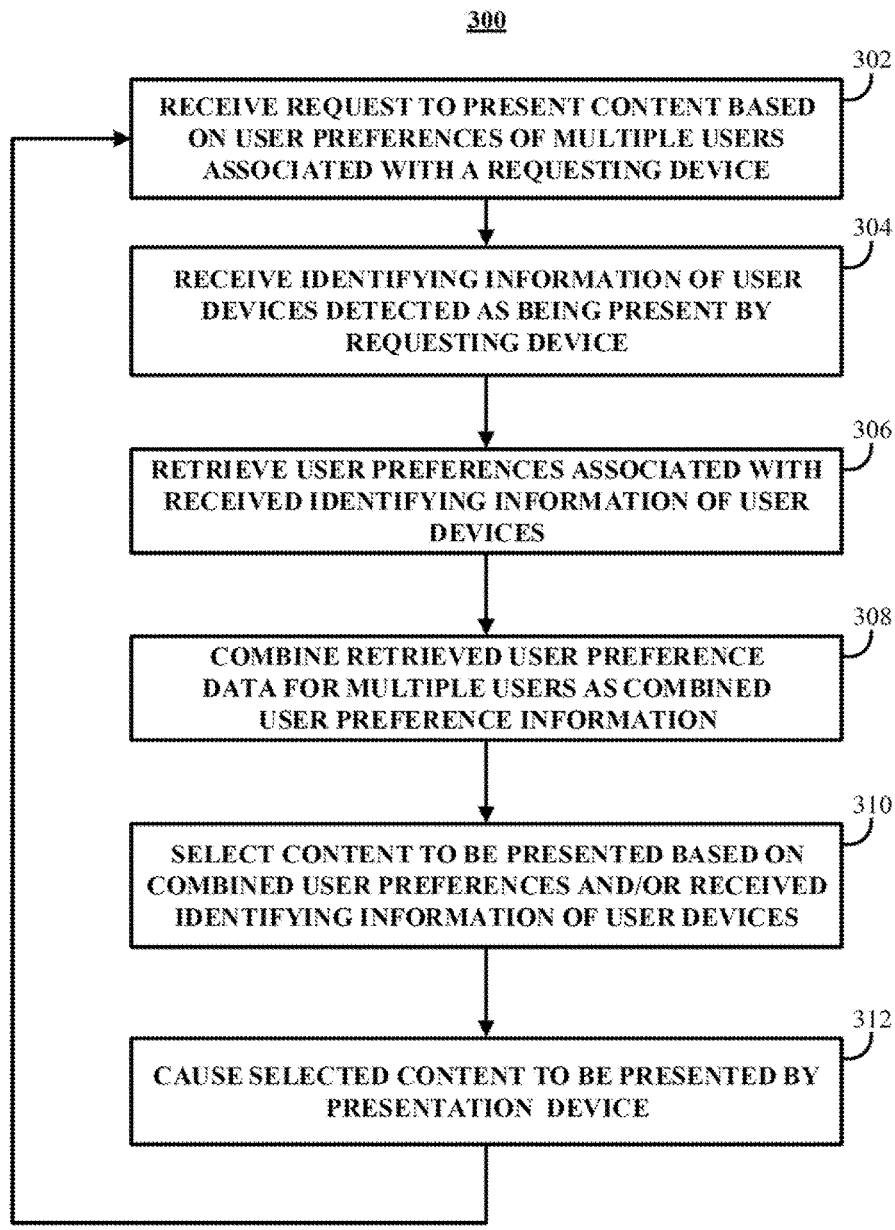
FIG. 3 shows an example of a process for presenting content based on user preferences of multiple users in the presence of a media presentation device in accordance with some implementations of the disclosed subject matter.

FIG. 3 shows an example 300 of a process for presenting content based on user preferences of multiple users in the presence of a media presentation device in accordance with some implementations of the disclosed subject matter. As shown in FIG. 3, process 300 can begin, at 302, by receiving a request to present content based on user preferences of multiple users associated with a requesting device, such as a presentation device. In some implementations, the request can be received using any suitable technique or combination of techniques and can be received from any suitable source such as a presentation device on which the content is to be presented and/or a user device associated with the presentation device.

At 304, process 300 can receive identifying information of user devices detected as being present by the requesting device (e.g., the device from which the request for content is received at 302) and/or any other suitable device. In some implementations, any suitable technique or combination of techniques can be used to detect the presence of a particular user device. For example, presentation device 110 can detect user devices that are connected to a same local network as presentation device 110 (e.g., a LAN including a Wi-Fi network). As another example, presentation device 110 can broadcast and/or unicast one or more messages targeting nearby user devices 102 using any suitable communication techniques, such as peer-to-peer communication techniques. In a more particular example, presentation device 110 can use transmitter/receiver 218 to transmit one or more signals (e.g., using any suitable communication standard such as Bluetooth, wireless USB, etc.) to any nearby user devices 102 which can, in some cases, receive the signal using transmitter/receiver 208 and respond with a message indicating that the user device is present. In another more particular example, presentation device 110 can use a speaker to emit a signal as sound waves, which can be outside the range of human hearing, to any nearby user devices 102 which can, in some cases, receive the signal using a microphone and respond with a message indicating that the user device is present.

In some implementations, in lieu of or in addition to a user device 102 responding to a signal from presentation device 110 to detect presence of user devices 102, user device 102 can transmit a signal to server 120 identifying itself as in the presence of presentation device 110.

At 306, process 300 can retrieve user preferences associated with the identifying information of devices received at 304. In some implementations, user preferences can be retrieved from any suitable location using any suitable technique or combination of techniques. For example, in some implementations, process 300 can cause user preferences of users that are associated with the presentation device that sent the request for content to be retrieved for use in determining which content is to be presented by the requesting user device. Additionally, in some implementations, a device executing process 300 (e.g., a first server 120) or any other suitable device or combination of devices (e.g., one or more other servers 120) can use the retrieved user preferences in any suitable combination to determine content that is to be presented by a requesting presentation device. In some implementations, user preferences can be retrieved from user preferences database 150 made available by one or more servers 120.

In some implementations, process 300 can compare identifying information for each user received at 304 to identifying information corresponding to user preferences stored in association with the presentation device that requested the content. In such implementations, for users not associated with the presentation device, process 300 can inhibit any user preferences of the non-associated users from being used in determining which content to present. For example, presentation device 110 and/or user devices 102 can send identifying information (e.g., a MAC address, a device ID, etc.) of all user devices that receive the signal from presentation device 110 and/or respond to such a signal, and server 120 executing process 300 can determine which of those devices are associated with a user that has user preferences associated with presentation device 110.

In some implementations, process 300 can cause user preferences of users that are associated with the presentation device that sent the request for content to be retrieved for use in determining which content is to be presented by the requesting user device. Additionally, in some implementations, a device executing process 300 (e.g., a first server 120) or any other suitable device or combination of devices (e.g., one or more other servers 120) can use the retrieved user preferences in any suitable combination to determine content that is to be presented by a requesting presentation device.

In some implementations, identifying information of user devices received at 304 can be grouped by process 300 using a group ID and/or any other suitable information to identify a particular combination of devices that are present. In such implementations, the group ID can correspond to user devices that are detected and for which there are user preferences associated with presentation device 110. When a combination of user devices that is different from combinations of user devices represented by existing group IDs is in proximity to a presentation device, a new group ID can be associated with the new combination. User preferences corresponding to all user devices represented by a group ID can be combined and associated with the group ID. These user preferences can then be used when that combination of devices is present. For example, when a first group of user devices is present a user preferences associated with first group ID can be used to determine content that is to be presented by a presentation device. In such an example, when another user device that has user preferences associated with the presentation device becomes present (e.g., a new user associates preferences with the user device, a user device with user preferences already associated comes into proximity of the device, etc.) of when a device that is present is no longer present (e.g., a user disassociates their user device from the presentation device, a user device leaves a proximity of the presentation device, etc.), user preferences associated with a different group ID can be used in determine which content is to be presented. In some implementations, user preferences associated with a group ID can be updated in response to any suitable action (e.g., user preferences of a particular user being updated, a user disassociating from the presentation device, after a predetermined period of time has elapsed, etc.).

In some implementations, user preferences can, for example, include a user's stated interests, a user's implied interests, media content that the user has consumed, media content and/or products about which the user has commented on and/or that the user has rated, and/or any other suitable information about the user. In some implementations, a user's implied interests can be based on user actions such as what types of media content the user consumes, what types of products the user buys, the user's actions with relation to the content and/or products (e.g., whether the user is engaged with the content/product by commenting and/or "liking" the content/product, a rating given to the content/product, etc.). In some implementations, a user is given an opportunity to determine which information is used in determining user preferences. For example, in some implementations, user preferences can be manually entered by a user. As another example, in some implementations, a user can select one or more sources of information that may or may not be used in determining user preferences. In some implementations, user preferences can be updated in response to a user instruction to update user preferences (e.g., in response to a user editing user preferences, making changes to permissions of which sources of information can be used for determining user preferences, etc.). Additionally or alternatively, user preferences can be updated automatically based on any suitable criteria or criterion, such as in response to an event (e.g., in response to the user taking an action with relation to content and/or a product), in response to a particular period of time having elapsed, etc.

In some implementations, user preferences can include identifying information of a user such as credentials, which can be used to access and/or retrieve content associated with the user. Additionally or alternatively, user preferences can include information that can be used to identify content that is related to the user, such as images of the user, images taken by the user, etc.

At 308, process 300 can combine the retrieved user preference information for multiple users to generate combined user preference information. In some implementations, process 300 can use any suitable technique or combination of techniques to generate the combined user preference information. For example, process 300 can use the retrieved user preferences to identify areas where at least two users have shared interests. As another example, process 300 can combine user preference information based on information common to multiple users, such that user preference information common to multiple users receives more weight in combined user preference information. As yet another example, process 300 can combine user preference information based on preference intensity associated with the user preferences of each user. As still another example, process 300 can use combinations of techniques to generate combined user preference information. In a more particular example, process 300 can generate one or more user preference scores based on the retrieved user preference information. Such scores can be related to various topics and/or areas of content. The scores can represent a prediction of the combined users' interest in content related to a particular topic and/or area of content.

At 310, process 300 can select content to be presented based on the combined user preferences information and/or received identifying information of user devices. In some implementations, the combined user preference information can be used to select any suitable content for presentation. For example, if the content requested at 302 is a slideshow of images, process 300 can use the combined user preference information to select images to be presented as part of the slideshow. In such an example, at 310, process 300 can select images that are related to topics and/or areas for which the combined user preferences indicate there is likely to be interest.

As another example, process 300 can select content related to users as content to be presented at 310. In such an example, process 300 can use user preference information such as a user account and/or credentials associated with a user to access and/or retrieve content associated with the user, such as images of the user, images taken by the user, images that the user showed interest in, images similar to images that the user showed interest in, images from a social connection of the user whose images the user has previously shown interest in, etc. In such an example, process 300 can select content related to each of the users at 310, and/or can select content related to a particular user that is likely to be interesting to a second user based on the second user's user preferences.

At 312, process 300 can cause selected content to be presented by the presentation device. Any suitable technique or combination of techniques can be used to cause the presentation device to present the selected content. For example, the content can be sent to the presentation device in response to the request for content received at 302. As another example, a location or locations from which the selected content can be accessed can be communicated to the presentation device, which can use the location information to retrieve and present the selected content.

Figure 4:
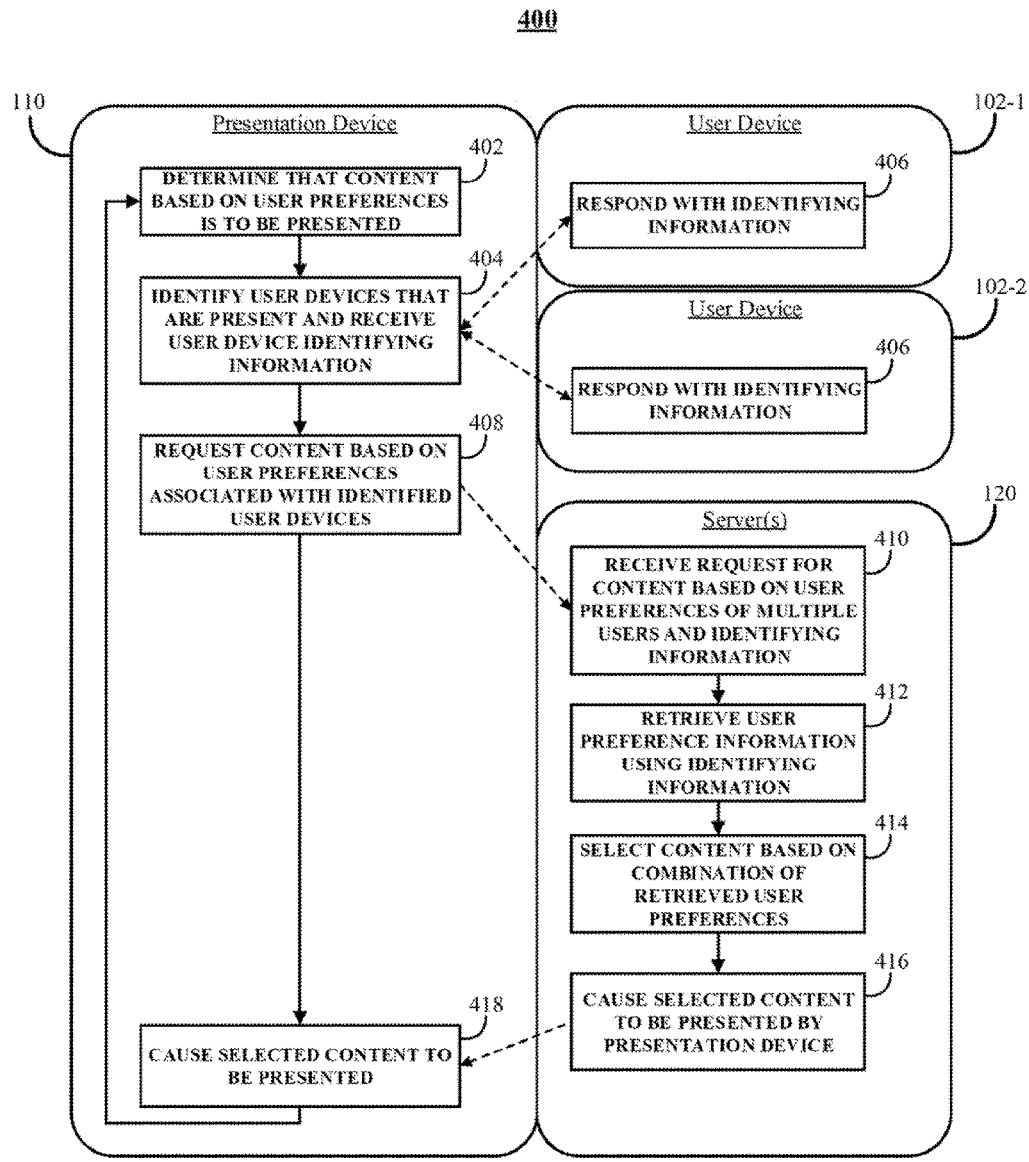
FIG. 4 shows a diagram illustrating an example of a data flow that can be used in processes of FIG. 3 among a presentation device, user devices, and one or more servers in accordance with some implementations of the disclosed subject matter.

FIG. 4 shows a diagram illustrating an example 400 of a data flow that can be used in processes of FIG. 3 among a presentation device 110, user devices 102-1 and 102-2, and one or more servers 120 in accordance with some implementations of the disclosed subject matter. At 402, presentation device 110 can determine that content based on user preferences of users that are present is to be presented. Such a determination can be made based on any suitable factor or factors and can be made in response to any suitable action. For example, presentation device 110 can make such a determination in response to a request from a user device to present content based on user preferences. In a more particular example, user device 102-1 can receive an input to an application and/or web page indicating that a slideshow of images based on user preferences is to be presented by presentation device 110, and the application and/or web page can cause user device 102-1 to instruct presentation device 110 to present such content.

As another example, presentation device 110 can make such a determination based on a lack of content requested by a user device. In a more particular example, presentation device 110 can be powered on and be selected for outputting content (e.g., by being connected to an HDMI port of a television that is selected as an active input for the television), but not have instructions to present any content. In such an example, presentation device 110 can determine that default content is to be presented, where the default content can include content, such as a slideshow of images, based on user preferences of detected users.

As still another example, if content has been queued for presentation by presentation device 110 (e.g., based on instructions from user devices 102-1, 102-2 and/or any other suitable user devices) and presentation of all the queued content has been completed, presentation device 110 can determine that default content such as the slideshow of images based on user preferences is to be presented (e.g., as described above).

At 404, presentation device 110 can identify user devices that are present and receive user device identifying information of present user devices. Presentation device 110 can identify user devices that are present using any suitable technique or combination of techniques. For example, as described above in connection with 304, presentation device 110 can detect user devices that are connected to a same local network as presentation device 110. In some implementations, a user device can be determined to be present based on any suitable criterion or combination of criteria, such as if the user device responds to a message sent by presentation device 110.

At 406, user devices 102-1 and 102-2 that are present can respond to a message from presentation device 110 with at least user identifying information (e.g., which can include user identifying information 130).

At 408, presentation device 110 can request content based on user preferences associated with the identified user devices (e.g., user devices 102-1 and 102-2) for presentation. In some implementations, presentation device 110 can use any suitable technique of combination of techniques to request content, such as techniques described above in connection with 302 of FIG. 3.

At 410, server 120 can receive the request for content based on user preferences associated with the devices identified at 404 and the identifying information received at 404. In some implementations, 410 can be similar to 302 and/or 304 of process 300 described above in connection with FIG. 3.

At 412, server 120 can retrieve user preference information using the user identifying information received at 410. In some implementations, 412 can be similar to 306 of process 300 described above in connection with FIG. 3.

At 414, server 120 can select content to be presented based on a combination of the user preference information retrieved at 412. In some implementations, 414 can be similar to 308 and/or 310 of process 300 described above in connection with FIG. 3.

At 416, server 120 can cause the selected content to be presented by presentation device 110. In some implementations, 416 can be similar to 312 of process 300 described above in connection with FIG. 3.

At 418, presentation device 110 can cause the selected content to be presented. In some implementations, causing the selected content to be presented can include any suitable techniques for receiving the content to be presented, requesting the content to be presented and/or presenting the content to be presented. For example, presentation device 110 can receive the content to be presented from a server (e.g., such as server 120) for delivering content. The content can be received in any suitable format and in response to any suitable request for content (and/or in the absence of a request for content in the case of content that is pushed to presentation device 110). As another example, presentation device 110 can receive location information indicating a location from which the content to be presented can be accessed (which can include one or more addresses formatted in any suitable format). In such an example, presentation device 110 can use the location information to retrieve and/or request the content.

As yet another example, presentation device can receive the content to be presented and output the content as audio and/or video data using an output of presentation device 110. Such an output can be to display 214 of presentation device 110, using an HDMI output of presentation device 110 (e.g., to a television and/or other display device), and/or using any other suitable technique of combination of techniques.

In some implementations, the mechanisms described herein can include software, firmware, hardware, or any suitable combination thereof. For example, the mechanisms described herein can encompass a computer program written in a programming language recognizable by one or more of hardware processors 202, 212 and 222 (e.g., a program written in a programming language, such as, Java, C, Objective-C, C++, C#, Javascript, Visual Basic, or any other suitable approaches). As another example, the mechanisms described herein can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 3 and 4 can be executed or performed in any order or sequence not limited to the order and sequence shown and described in the figures. Also, some of the above steps of the processes of FIGS. 3 and 4 can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for presenting content based on user preferences of multiple users in the presence of a media presentation device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for determining content to be presented, the method comprising:
   receiving, from a media presentation device, a request for content to be used in presenting a slideshow of images based on user preferences associated with user devices;
   receiving, from the media presentation device, identifying information of a first user device and identifying information of a second user device;
   retrieving, using a hardware processor of a server, first user preferences associated with a first user using the identifying information of the first user device, wherein the first user preferences include first user credentials associated with a first user of the first user device;
   retrieving, using the hardware processor, second user preferences associated with a second user using the identifying information of the second user device, wherein the second user preferences include second user credentials associated with a second user of the second user device;
   generating, using the hardware processor, combined user preferences based on the first user preferences and the second user preferences;
   selecting, using the hardware processor, images for the slideshow from a plurality of images by accessing images associated with the first user using the first user credentials and images associated with the second user using the second user credentials and based on metadata associated with each of the plurality of images;
   causing, using the hardware processor, the media presentation device to present the selected images as part of the slideshow as a response to the request;
   receiving, using the hardware processor, an indication that the second user device has disassociated from the presentation device; and
   in response to receiving the indication, inhibiting, using the hardware processor, use of the combined user preferences in determining which of the plurality of images to be presented in the slideshow.

2. The method of claim 1, wherein the selected images include images with metadata indicating that the images are of the first user and images with metadata indicating that the images are of the second user, and the plurality of images includes images related to the first user and images related to the second user.

3. The method of claim 1, wherein generating combined user preferences comprises determining a common interest of the first user and the second user based on the retrieved first user preferences and the retrieved second user preferences, wherein selecting images for the slideshow comprises selecting images with metadata indicating that the image corresponds to the common interest.

4. The method of claim 1, wherein the first user preferences include first user preference scores for one or more topics based on the first user preferences and the second user preferences include second user preference scores for one or more topics based on the second user preferences, and wherein generating combined user preferences comprises generating combined user preference scores based on the first user preference scores and the second user preference scores.

5. The method of claim 1, further comprising:
generating a group identifier;
associating the group identifier with the first device and the second device; and
associating the combined user preferences with the group identifier.

6. The method of claim 1, further comprising:
receiving, from the media presentation device, identifying information of a third user device; and
determining whether third user preferences associated with a third user of the third user device are associated with the media presentation device, wherein, in response to determining that the third user preferences associated with the third user of the third user device are associated with the media presentation device, the combined user preferences are generated using the first user preferences and the second user preferences while inhibiting the third user preferences from being used to generate the combined user preferences.

7. The method of claim 1, wherein the plurality of images includes one or more of: images of the first user, images of the second user, images taken by the first user, images taken by the second user, images that the first user has shown interest in, images that the second user has shown interest in, similar images to the images that the first user has shown interest in, similar images to the images that the second user has shown interest in, images from a social connection of the first user whose images the first user has shown interest in, and images from a social connection of the second user whose images the second user has shown interest in.

8. The method of claim 1, wherein causing the media presentation device to present the selected images as part of the slideshow further comprises transmitting the selected images to the media presentation device.

9. The method of claim 1, wherein causing the media presentation device to present the selected images as part of the slideshow further comprises transmitting one or more locations for retrieving the selected images to the media presentation device.

10. A system for determining content to be presented, the system comprising:
a hardware processor that is programmed to:
receive, from a media presentation device, a request for content to be used in presenting a slideshow of images based on user preferences associated with user devices;
receive, from the media presentation device, identifying information of a first user device and identifying information of a second user device;
retrieve first user preferences associated with a first user using the identifying information of the first user device, wherein the first user preferences include first user credentials associated with a first user of the first user device;
retrieve second user preferences associated with a second user using the identifying information of the second user device, wherein the second user preferences include second user credentials associated with a second user of the second user device;
generate combined user preferences based on the first user preferences and the second user preferences;
select images for the slideshow from a plurality of images by accessing images associated with the first user using the first user credentials and images associated with the second user using the second user credentials and based on metadata associated with each of the plurality of images;
cause, using the hardware processor, the media presentation device to present the selected images as part of the slideshow as a response to the request;
receive an indication that the second user device has disassociated from the presentation device; and
in response to receiving the indication, inhibit use of the combined user preferences in determining which of the plurality of images to be presented in the slideshow.

11. The system of claim 10, wherein the selected images include images with metadata indicating that the images are of the first user and images with metadata indicating that the images are of the second user, and the plurality of images includes images related to the first user and images related to the second user.

12. The system of claim 10, wherein generating combined user preferences comprises determining a common interest of the first user and the second user based on the retrieved first user preferences and the retrieved second user preferences, wherein selecting images for the slideshow comprises selecting images with metadata indicating that the image corresponds to the common interest.

13. The system of claim 10, wherein the first user preferences include first user preference scores for one or more topics based on the first user preferences and the second user preferences include second user preference scores for one or more topics based on the second user preferences, and wherein the hardware processor is further programmed to generate combined user preference scores based on the first user preference scores and the second user preference scores.

14. The system of claim 10, wherein the hardware processor is further programmed to:
generate a group identifier;
associate the group identifier with the first device and the second device; and
associate the combined user preferences with the group identifier.

15. The system of claim 10, wherein the hardware processor is further programmed to:
receive, from the media presentation device, identifying information of a third user device; and
determine whether third user preferences associated with a third user of the third user device are associated with the media presentation device, wherein, in response to determining that the third user preferences associated with the third user of the third user device are associated with the media presentation device, the combined user preferences are generated using the first user preferences and the second user preferences while inhibiting the third user preferences from being used to generate the combined user preferences.

16. A non-transitory computer-readable medium containing computer executable instructions that, when executed by a processor, cause the processor to perform a method for determining content to be presented, the method comprising:
receiving, from a media presentation device, a request for content to be used in presenting a slideshow of images based on user preferences associated with user devices;
receiving, from the media presentation device, identifying information of a first user device and identifying information of a second user device;
retrieving first user preferences associated with a first user using the identifying information of the first user device, wherein the first user preferences include first user credentials associated with a first user of the first user device;

retrieving second user preferences associated with a second user using the identifying information of the second user device, wherein the second user preferences include second user credentials associated with a second user of the second user device;

generating combined user preferences based on the first user preferences and the second user preferences;

selecting images for the slideshow from a plurality of images by accessing images associated with the first user using the first user credentials and images associated with the second user using the second user credentials and based on metadata associated with each of the plurality of images;

causing the media presentation device to present the selected images as part of the slideshow as a response to the request;

receiving an indication that the second user device has disassociated from the presentation device; and in response to receiving the indication, inhibiting use of the combined user preferences in determining which of the plurality of images to be presented in the slideshow.

17. The non-transitory computer-readable medium of claim 16, wherein the selected images include images with metadata indicating that the images are of the first user and images with metadata indicating that the images are of the second user, and the plurality of images includes images related to the first user and images related to the second user.

18. The non-transitory computer-readable medium of claim 16, wherein generating combined user preferences comprises determining a common interest of the first user and the second user based on the retrieved first user preferences and the retrieved second user preferences, wherein selecting images for the slideshow comprises selecting images with metadata indicating that the image corresponds to the common interest.

19. The non-transitory computer-readable medium of claim 16, wherein the first user preferences include first user preference scores for one or more topics based on the first user preferences and the second user preferences include second user preference scores for one or more topics based on the second user preferences, and wherein generating combined user preferences comprises generating combined user preference scores based on the first user preference scores and the second user preference scores.

20. The non-transitory computer-readable medium of claim 16, wherein the method further comprises:
generating a group identifier;
associating the group identifier with the first device and the second device; and
associating the combined user preferences with the group identifier.

21. The non-transitory computer-readable medium of claim 16, wherein the method further comprises:
receiving, from the media presentation device, identifying information of a third user device; and
determining whether third user preferences associated with a third user of the third user device are associated with the media presentation device, wherein, in response to determining that the third user preferences associated with the third user of the third user device are associated with the media presentation device, the combined user preferences are generated using the first user preferences and the second user preferences while inhibiting the third user preferences from being used to generate the combined user preferences.

* * * * *